United States Patent
Song (10) Patent No.: US 10,972,681 B2
(45) Date of Patent: Apr. 6, 2021

(54) IMAGE ENCODING METHOD AND SYSTEM

(71) Applicant: SZ DJI TECHNOLOGY CO., LTD., Shenzhen (CN)

(72) Inventor: Liang Song, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 91 days.

(21) Appl. No.: 16/294,295

(22) Filed: Mar. 6, 2019

(65) Prior Publication Data

US 2019/0208138 A1 Jul. 4, 2019

Related U.S. Application Data

(63) Continuation of application No. PCT/CN2016/098605, filed on Sep. 9, 2016.

(51) Int. Cl.
*H04N 5/265* (2006.01)
*H04N 19/46* (2014.01)
*H04N 19/85* (2014.01)
*H04N 5/262* (2006.01)
*H04N 7/12* (2006.01)

(52) U.S. Cl.
CPC .......... *H04N 5/265* (2013.01); *H04N 5/2624* (2013.01); *H04N 5/2628* (2013.01); *H04N 7/12* (2013.01); *H04N 19/46* (2014.11); *H04N 19/85* (2014.11)

(58) Field of Classification Search
CPC ............... H04N 1/3876; H04N 5/2258; H04N 5/23238; H04N 5/265; H04N 5/2624; H04N 19/46; H04N 19/85; H04N 7/12; G06T 3/0093; G06T 5/005

USPC ...................................................... 382/232
See application file for complete search history.

(56) References Cited

U.S. PATENT DOCUMENTS

| | | | | |
|---|---|---|---|---|
| 2005/0203724 A1* | 9/2005 | Orpaz | ............... | G06T 11/00 703/6 |
| 2010/0142798 A1* | 6/2010 | Weston | ............... | G06T 7/521 382/141 |
| 2010/0157017 A1 | 6/2010 | Pepperell | | |
| 2013/0208997 A1* | 8/2013 | Liu | ............... | G06T 3/4038 382/284 |
| 2013/0250047 A1* | 9/2013 | Hollinger | ............... | H04N 7/183 348/36 |
| 2014/0375759 A1* | 12/2014 | Mikes | ............... | H04N 5/23238 348/36 |
| 2015/0296146 A1* | 10/2015 | Scanlon | ............... | H04N 7/181 348/82 |

(Continued)

FOREIGN PATENT DOCUMENTS

| | | | |
|---|---|---|---|
| CN | 101702305 A | 5/2010 | |
| CN | 101938623 A | 1/2011 | |

(Continued)

OTHER PUBLICATIONS

The World Intellectual Property Organization (WIPO) The International Search Report for PCT/CN2016/098605 dated Jan. 20, 2017 8 pages.

*Primary Examiner* — Ali Bayat
(74) *Attorney, Agent, or Firm* — Anova Law Group, PLLC (57) ABSTRACT

An image encoding method includes preprocessing source images according to preset preprocessing requirements to generate preprocessed images, merging the preprocessed images according to preset merging requirements to generate a target image, and encoding the target image.

16 Claims, 10 Drawing Sheets

(56) References Cited

U.S. PATENT DOCUMENTS

2016/0292827 A1* 10/2016 Holland ................. G06T 5/002

FOREIGN PATENT DOCUMENTS

| | | | |
|---|---|---|---|
| CN | 102098443 | A | 6/2011 |
| CN | 102724433 | A | 10/2012 |
| CN | 103024363 | A | 4/2013 |
| CN | 103248863 | A | 8/2013 |
| CN | 103595896 | A | 2/2014 |
| CN | 104270597 | A | 1/2015 |
| CN | 104661085 | A | 5/2015 |
| CN | 204887208 | U | 12/2015 |
| CN | 105282597 | A | 1/2016 |
| CN | 105898384 | A | 8/2016 |

* cited by examiner

IMAGE ENCODING METHOD AND SYSTEM

CROSS-REFERENCE TO RELATED APPLICATION

This application is a continuation application of International Application No. PCT/CN2016/098605, filed on Sep. 9, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to image encoding and, more particularly, to a method and system for encoding image.

BACKGROUND

In the field of aerial photography and entertainment using Unmanned Aerial Vehicle (UAV), the wireless image transmission system (or simply "wireless image transmission" or "image transmission") has become an important component of the UAV.

With the development of market and the diversification of market demand, the demand of installing two or more cameras on a UAV for simultaneous multichannel image transmission is getting stronger and stronger. In conventional technologies, the multichannel image transmission (herein, two-channel image transmission is taken as an example) can be achieved using the following methods.

For example, two sets of image transmission system that are mutually independent are each used to perform image acquisition, image encoding, image sending, image receiving, image decoding, image display, image storing, and the like. The two sets of system (except for the wireless sending and receiving components) work independently and do not interfere with each other.

For another example, two encoders are used to independently encode images from two cameras, and then a multiplexer is used to alternately transmit two bitstreams, from which data is transmitted to the opposite terminal via a same set of wireless transmitter/receiver. After receiving the data, the opposite terminal uses a demultiplexer to restore the data into two independent image bitstreams, and then performs decoding, display, storing, and other subsequent processes on the two bitstreams.

However, the two solutions described above cannot simultaneously satisfy multiple requirements of keeping the bandwidth, image quality, and effective transmission distance unchanged.

SUMMARY

In accordance with the disclosure, there is provided an image encoding method including preprocessing source images according to preset preprocessing requirements to generate preprocessed images, merging the preprocessed images according to preset merging requirements to generate a target image, and encoding the target image.

Also in accordance with the disclosure, there is provided an image encoding system including a processor and an encoder. The processor is configured to preprocess source images according to preset preprocessing requirements and merge preprocessed images according to preset merging requirements to generate a target image. The encoder is coupled to the processor and is configured to encode the target image.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first assembly is referred to as "coupled to" a second assembly, it is intended that the first assembly may be directly attached to the second assembly or may be indirectly attached to the second assembly via another assembly. When a first assembly is referred to as "connecting" to a second assembly, it is intended that the first assembly may be directly connected to the second assembly or may be indirectly connected to the second assembly via a third assembly between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

A wireless image transmission system generally includes an image transmitting terminal and an image receiving terminal. The image transmitting terminal includes a camera, an encoder, a wireless transmitter, a first memory, and other components. The image receiving terminal includes a wireless receiver, a decoder, a display screen, a second memory, and other components.

Multichannel image transmission, for example, two-channel image transmission, can be achieved using the following methods. One method uses two image transmission systems that are mutually independent. Another method includes using two encoders to independently encode images from two cameras, using a multiplexer to alternately transmit two bitstreams, and transmitting data from the two bitstreams to the opposite terminal via a same set of wireless transmitter/receiver.

The above-described solutions may increase the complexity and cost of the system. Further, the bandwidth requirement is increased and the transmission is vulnerable to external environment interference, resulting in decreased effective transmission distance. Moreover, degrading the image quality in exchange for a lower bit rate can reduce the user experience.

According to the present disclosure, source images are preprocessed and then preprocessed images are merged together to generate a target image, which is then encoded for transmission. As such, simultaneous multichannel image transmission can be achieved with limited wireless bandwidth, and without degrading the image quality of the main stream or reducing the wireless transmission distance.

Figure 1:
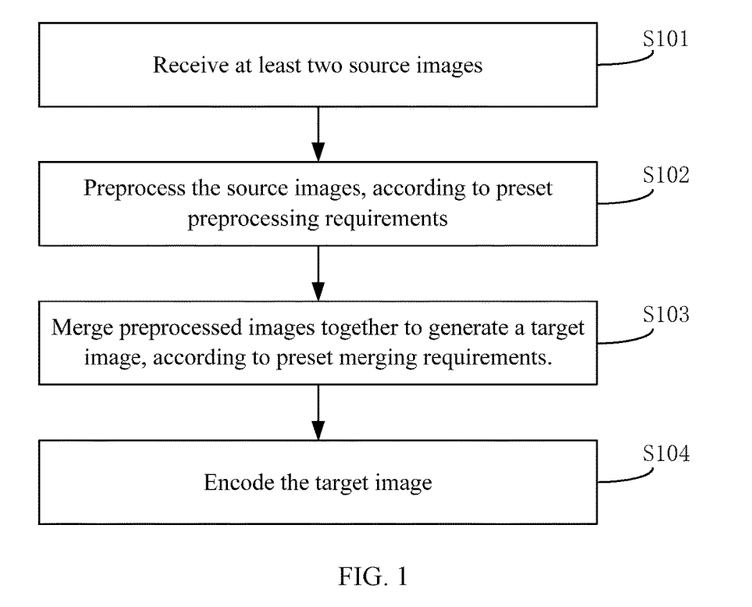
FIG. 1 is a schematic flow chart of an image encoding method according to an exemplary embodiment.

FIG. 1 is a flow chart of an image encoding method consistent with the disclosure. As shown in FIG. 1, at S101, at least two source images are received.

The source images refer to the images that are not preprocessed, such as the source images obtained from cameras, the source images obtained from video cameras, or the like.

The at least two source images are obtained from at least two image sources, respectively. An image source can be, e.g., a camera or a video camera. For example, the at least two source images can be obtained from at least two cameras, from at least two video cameras, or from both cameras and video cameras, or the like.

At S102, according to preset preprocessing requirements, the source images are preprocessed to obtain preprocessed images.

The preprocessing requirements of the source images from the image sources are preset. When the at least two source images are received, the source images are preprocessed according to the preset preprocessing requirements. The obtained preprocessed images are images used for merging as described below, and are also referred to as "merging images."

The preprocessing includes, but is not limited to, at least one of a scaling process, a cropping process, or a stretching-shrinking process. The scaling process is to reduce or enlarge the size of the image by an equal percentage along the X-axis and Y-axis directions. The cropping process is to crop part of the image and keep the remaining part of the image. The stretching-shrinking process is to reduce or enlarge the size of the image along the X-axis or Y-axis directions, or to reduce or enlarge the size of the image disproportionately along the X-axis and Y-axis directions.

At S103, the preprocessed images are merged together to generate a target image according to preset merging requirements.

The merging requirements refer to requirements indicating how the at least two preprocessed images are merged together, such as merging orders, merging coordinates, transparencies, or the like. The merging requirements are preset, and then, according to the preset merging requirements, the preprocessed images are merged together to generate the target image. That is, in one embodiment, at least two preprocessed images are merged together to generate one target image. In one embodiment, a plurality of preprocessed images are merged together to generate a plurality of target images, but the target images are fewer than the corresponding source images.

At S104, the target image is encoded.

Consistent with the present disclosure, the at least two source images are received. According to the preset preprocessing requirements, the source images are preprocessed. According to the preset merging requirements, the preprocessed images are merged together to generate the target image. The target image is then encoded. Because the source images are preprocessed and then the preprocessed images are merged together to generate the target image, which is then encoded for transmission, simultaneous multichannel image transmission can be achieved with a limited wireless bandwidth and without degrading the image quality of the main stream or reducing the wireless transmission distance.

In some embodiments, receiving the at least two source images (S101) can include storing the source images in respective input caches.

The source images are stored in respective input caches such that the source images can be fetched when needed.

In some embodiments, after the source images are preprocessed according to the preset preprocessing requirement (S102), the preprocessed images may be stored in respective output caches, and, according to the preset merging requirements, the preprocessed images are merged together to generate the target image.

The source images are stored in respective output caches such that the preprocessed images can be fetched when needed.

In some embodiments, the preset merging requirements include the merging orders and the merging coordinates.

The merging orders refer to the orders of the preprocessed images, by which the preprocessed images are merged together. The merging coordinates refer to the coordinates of the preprocessed images in the target image. In some embodiments, the merging coordinates of a preprocessed image can be, for example, coordinates of one point (pixel), such as the lower left point, of the preprocessed image in the target image. According to the merging orders and the merging coordinates, the preprocessed images can be merged together to generate the target image.

In some embodiments, merging the preprocessed images together to generate the target image according to the preset merging requirements (S103) can include storing the preprocessed images in a target cache sequentially according to the merging orders and the merging coordinates, and forming the target image in the target cache.

The preprocessed images are stored sequentially in the target cache and the target image is formed in the target cache such that the merging process can be performed methodically and the target image can be fetched when needed.

In one embodiment, merging the preprocessed images together to generate the target image according to the preset merging requirements (S103) can further include arranging the preprocessed images by at least partially overlapping or in a split-screen mode.

In another embodiment, merging the preprocessed images together to generate the target image according to the preset merging requirements (S103) can include configuring one or more of the preprocessed images to be hidden or semi-transparent.

In some embodiments, before receiving the at least two source images (S101), a user's display requirement can be received, and the preprocessing requirements, the merging requirements, and enable flags can be set according to the display requirement.

In some embodiments, setting the preprocessing requirements, the merging requirements, and the enable flags according to the display requirement includes managing an image input-output processing matrix table according to the display requirement. The image input-output processing matrix table includes image source identifications for distinguishing the image sources and, the preprocessing requirements, the merging requirements, and the enable flags that are associated with the image source identifications.

In some embodiments, receiving the at least two source images (S101) can include receiving source images from the image sources specified by the enable flags.

The image input-output processing matrix table may further include whether to store the source images and the preprocessed images, and may also include the display transparencies, such as hidden, transparent, semi-transparent, or the like.

For example, Table 1 shows a template of the image input-output processing matrix table. In this example, the image source identifications include camera numbers; the enable flags include whether to enable the cameras; the preprocessing requirements include source resolutions of the source images, target resolutions for the source images (i.e., target resolutions of the preprocessed images), and whether to stretch the source images; and the merging requirements include the merging orders and the merging coordinates.

TABLE 1

Image input-output processing matrix table template

| Camera number | Whether to enable | Whether to store | Source resolution | Target resolution | Whether to stretch | Merging order | Merging coordinates |
|---|---|---|---|---|---|---|---|
| Camera 1 | ? | ? | ? | ? | ? | ? | ? |
| Camera 2 | ? | ? | ? | ? | ? | ? | ? |
| Camera 3 | ? | ? | ? | ? | ? | ? | ? |
| Camera 4 | ? | ? | ? | ? | ? | ? | ? |

For each display requirement sent by the user, the system manages a corresponding "image input-output processing matrix table" as shown in Table 1. For each camera, Table 1 specifies whether to enable the camera, whether to separately store the encoded bitstream, the source resolution, the target resolution, whether to perform stretching-deformation operation when the image resolution is changed, the merging order of the image in the target cache after resolution change, the starting and ending coordinates of the image, and the like.

In an embodiment, the apparatus in which the present method is implemented is referred to as a "multiple-input single-output image processor." According to recorded information and the implementation procedures in the "image input-output processing matrix table," the work flow and main operations of the "multiple-input single-output image processor" are as follows.

1) According to the "image input-output processing matrix table," whether to enable a camera and receive a source image from the camera is determined.

2) According to the "image input-output processing matrix table," whether to individually compress and store the source image from the camera is determined.

3) For all cameras configured as "enable," the "multiple-input single-output image processor" receives the source images outputted from the cameras in parallel and temporarily stores the source images in the input cache.

4) Every time a complete source image frame from a camera is received, the "multiple-input single-output image processor" performs scaling, cropping, stretching, and/or other preprocessing processes on the inputted source image according to the preset "source resolution," "target resolution," "whether to perform stretching conversion on the image," and/or other items, and temporarily stores the preprocessed image in the output cache that is independently created for the camera.

5) After the frame synchronization for all enabled cameras is completed, the preprocessed images in the output caches associated with the enabled cameras are sequentially copied into the target cache to form the target image according to the merging orders and the merging coordinates in the "image input-output processing matrix table."

6) The "multiple-input single-output image processor" sends the target image in the target cache to the encoder, such that subsequent encoding, sending, receiving, storing, decoding, displaying, and other processes can be performed, detailed description of which is omitted here.

7) When the user wishes to change how the multichannel image is displayed on the display screen, the user can send a command from the receiving terminal to the transmitting terminal to select another preset display format. When receiving the command, the "multiple-input single-output image processor" can reprocess the source images from the cameras according to a new "image input-output processing matrix table," so that the multichannel image can be displayed in the way desired by the user.

Figure 2:
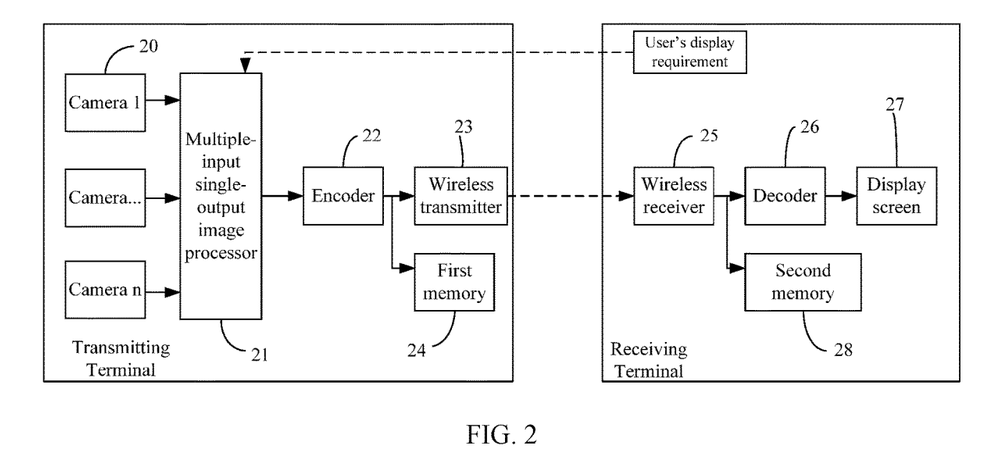
FIG. 2 is an overall architecture diagram of an image transmission system according to the disclosed image encoding method.

FIG. 2 shows an overall architecture diagram of an exemplary image transmission system consistent with the disclosure. The image transmission system includes a transmitting terminal and a receiving terminal. The transmitting terminal includes cameras 20 (including Camera 1, Camera 2, . . . , and Camera n) a multiple-input single-output image processor 21, an encoder 22, a wireless transmitter 23, and a first memory 24. The receiving terminal includes a wireless receiver 25, a decoder 26, a display screen 27, and a second memory 28. The user of the receiving terminal may transmit the display requirement to the multiple-input single-output image processor 21 of the transmitting terminal to manage the "image input-output processing matrix table" according to the display requirement.

In one embodiment, the multiple-input single-output image processor 21 may include one or more processors.

In one embodiment, the first memory 24 may store the source images, the preprocessed images, and the target image.

FIGS. 3-16 show the processes of scaling, cropping, stretching/shrinking of the image according to the above work flow, and the examples of multichannel image layout.

Some examples are described below in connection with Tables 2-4.

Figure 3:
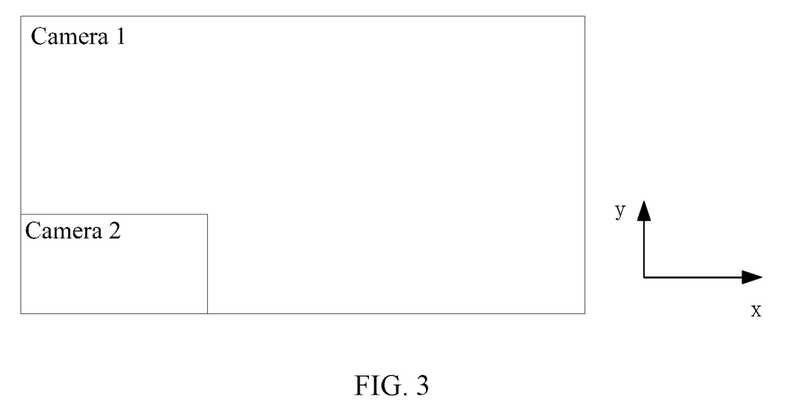
FIGS. 3-16 are schematic diagrams illustrating examples of multichannel image layout in practical applications according to the disclosed image encoding method.
Figure 4:
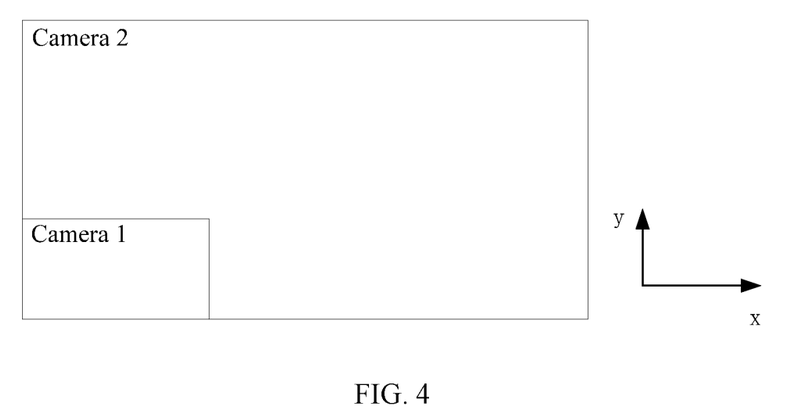

For example, according to the image input-output processing matrix table shown in Table 2, the source images from Camera 1 (resolution 3840*2160) and Camera 2 (resolution 1280*720) are preprocessed. The display effect is shown in FIG. 3.

Figure 5:
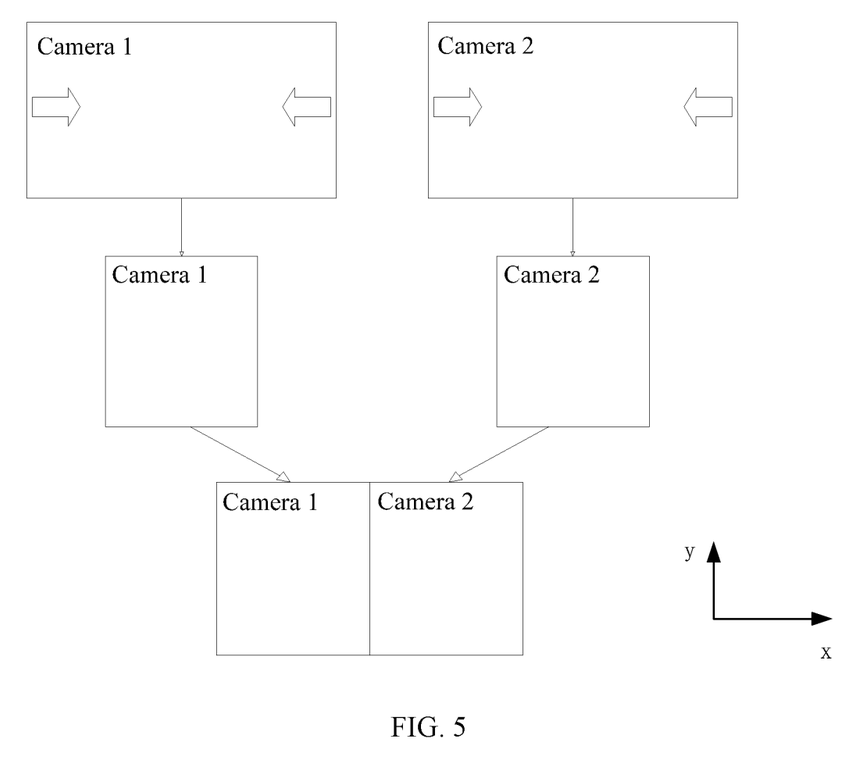

As another example, according to the image input-output processing matrix table shown in Table 3, the source images from Camera 1 (resolution 3840*2160) and Camera 2 (resolution 1280*720) are preprocessed. The display effect is shown in FIG. 5.

Figure 6:
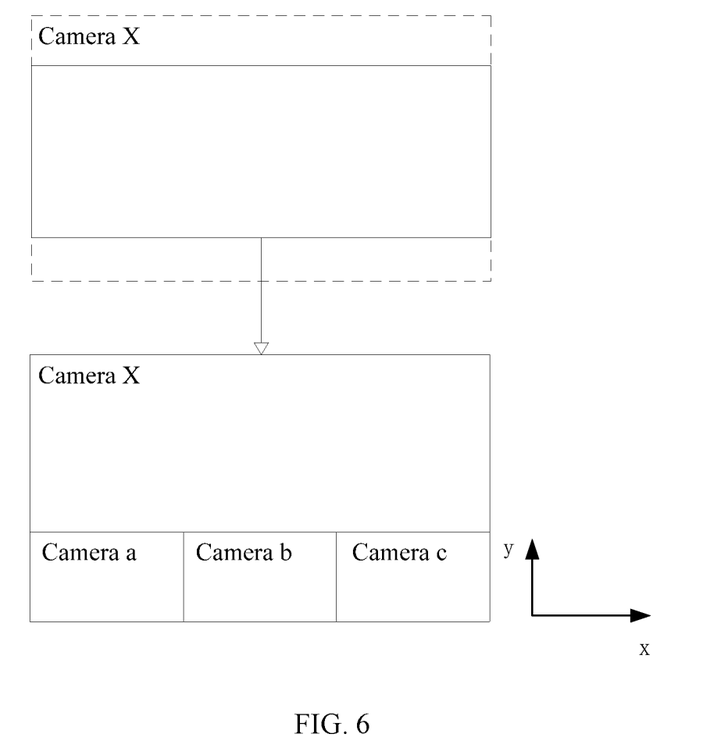

As a further example, according to the image input-output processing matrix table shown in Table 4, the source images from Camera 1 (resolution 3840*2160) and Camera 2 (resolution 1280*720) are preprocessed. The display effect is shown in FIG. 6.

The details of FIGS. 3 to 16 are described as follows.

According to the image input-output processing matrix table shown in Table 2, Camera 1 is configured to be enabled, and the corresponding source image and preprocessed image are configured to be stored. The source resolution of the source image of Camera 1 is 3840*2160, and the target resolution of Camera 1 in the target image (i.e., the resolution of corresponding preprocessed image in the target image) is 1280*720. No stretching process is required for Camera 1. The preprocessed image from Camera 1 is the first merging image with the merging coordinates (0, 0). Further, Camera 2 is configured to be enabled, and the corresponding source image and preprocessed image are configured to be not stored. The source resolution of the source image of Camera 2 is 1280*720, and the target resolution of Camera 2 in the target image is 427*240. No stretching process is required for Camera 2. The preprocessed image from Camera 2 is the second merging image with the merging coordinates (0, 0). Cameras 3 and 4 are configured to be not enabled. The display effect of the multichannel image consistent with Table 2 is shown in FIG. 3. In the target image, the image from Camera 1 is displayed as the main image, and the image from Camera 2 is displayed as the secondary image. In another embodiment, by changing the contents in Table 2, the display effect shown in FIG. 4 can be obtained, where in the target image, the image from Camera 2 is displayed as the main image, and the image from Camera 1 is displayed as the secondary image.

TABLE 2

First example of image input-output processing matrix table

| Camera number | Whether to enable | Whether to store | Source resolution | Target resolution | Whether to stretch | Merging order | Merging coordinates |
|---|---|---|---|---|---|---|---|
| Camera 1 | Yes | Yes | 3840 * 2160 | 1280 * 720 | No | 1 | 0.0 |
| Camera 2 | Yes | No | 1280 * 720 | 427 * 240 | No | 2 | 0.0 |
| Camera 3 | No | NA | NA | NA | NA | NA | NA |
| Camera 4 | No | NA | NA | NA | NA | NA | NA |

According to the image input-output processing matrix table shown in Table 3, the source images from Cameras 1 and 2 are stretched in the left-right direction, i.e., the X-axis direction, and are arranged side-by-side in the left-right direction when merging. The display effect of the multichannel image consistent with Table 3 is shown in FIG. 5.

TABLE 3

Second example of image input-output processing matrix table

| Camera number | Whether to enable | Whether to store | Source resolution | Target resolution | Whether to stretch | Merging order | Merging coordinates |
|---|---|---|---|---|---|---|---|
| Camera 1 | Yes | Yes | 3840 * 2160 | 640 * 720 | Yes | 1 | 0.0 |
| Camera 2 | Yes | No | 1280 * 720 | 640 * 720 | Yes | 2 | 640.0 |
| Camera 3 | No | NA | NA | NA | NA | NA | NA |
| Camera 4 | No | NA | NA | NA | NA | NA | NA |

According to the image input-output processing matrix table shown in Table 4, the source image from Camera X is cropped in the up-down direction, i.e., the Y-axis direction. In the target image, the image from Camera X is displayed as the main image, and the images from Cameras a, b, and c are displayed as the secondary images. The display effect of the multichannel image consistent with Table 4 is shown in FIG. 6

TABLE 4

Third example of image input-output processing matrix table

| Camera number | Whether to enable | Whether to store | Source resolution | Target resolution | Whether to stretch | Merging order | Merging coordinates |
|---|---|---|---|---|---|---|---|
| Camera X | Yes | Yes | 3840 * 2160 | 1280 * 480 | No | 1 | 0.240 |
| Camera a | Yes | No | 1280 * 720 | 427 * 240 | No | 2 | 0.0 |
| Camera b | Yes | No | 1280 * 720 | 427 * 240 | No | 3 | 427.0 |
| Camera c | Yes | No | 1280 * 720 | 427 * 240 | No | 4 | 854.0 |

Figure 7:
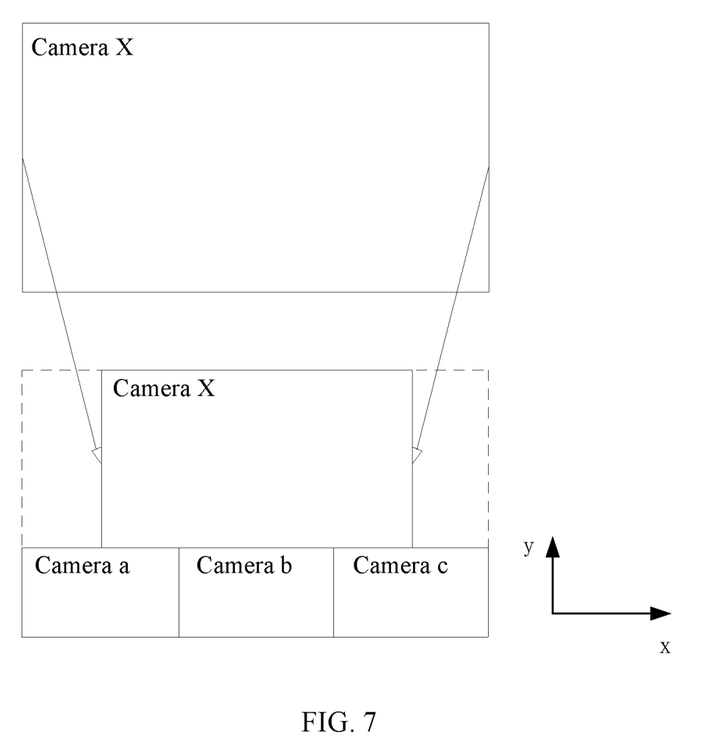
Figure 8:
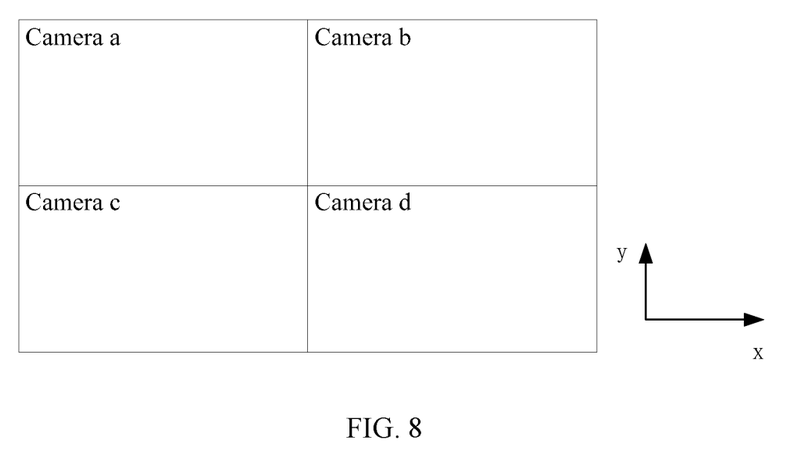
Figure 9:
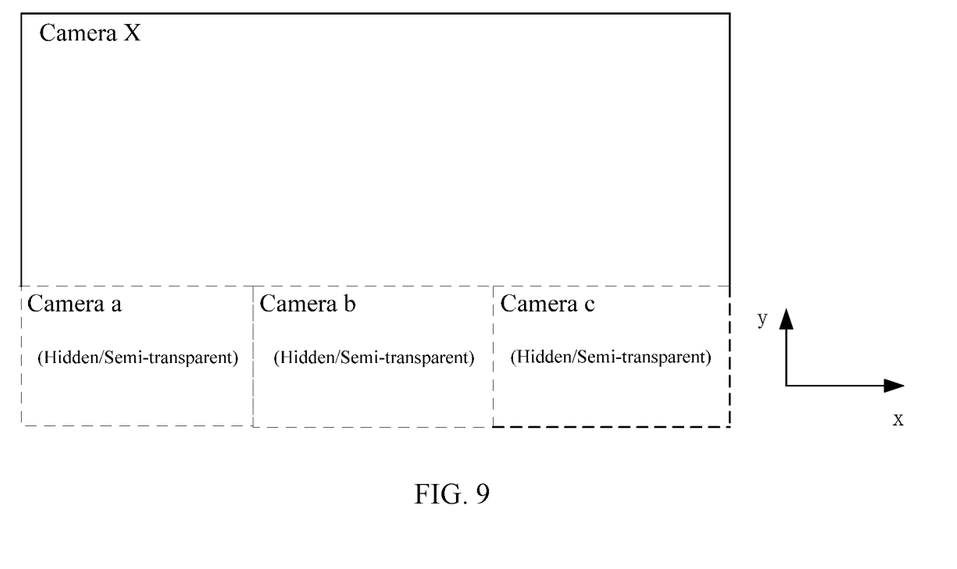
Figure 10:
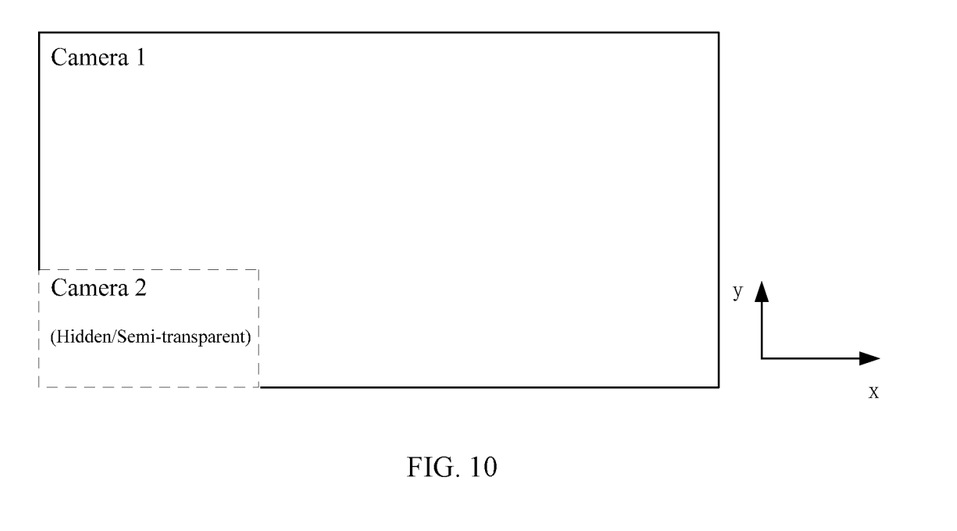
Figure 11:
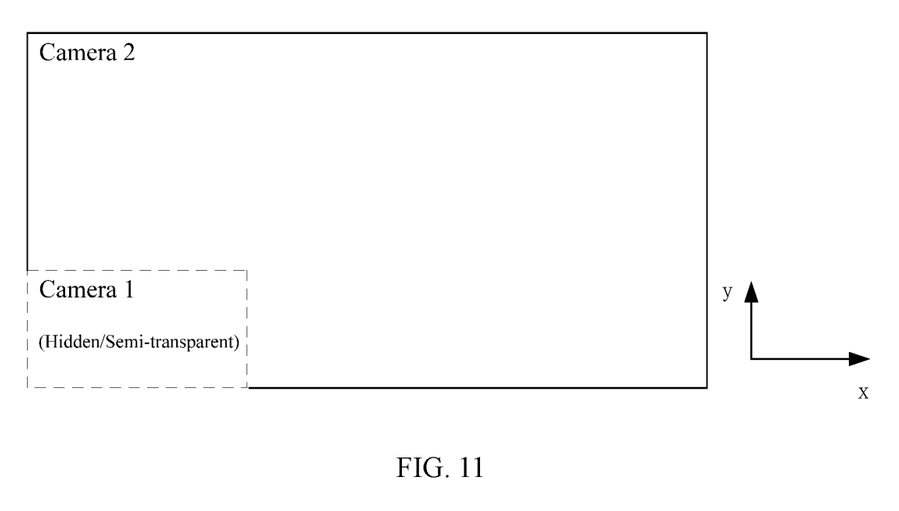
Figure 12:
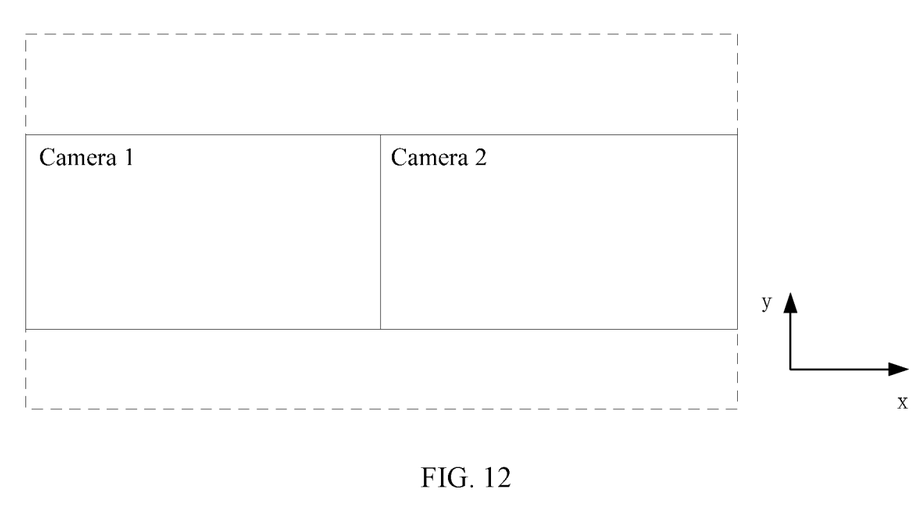
Figure 13:
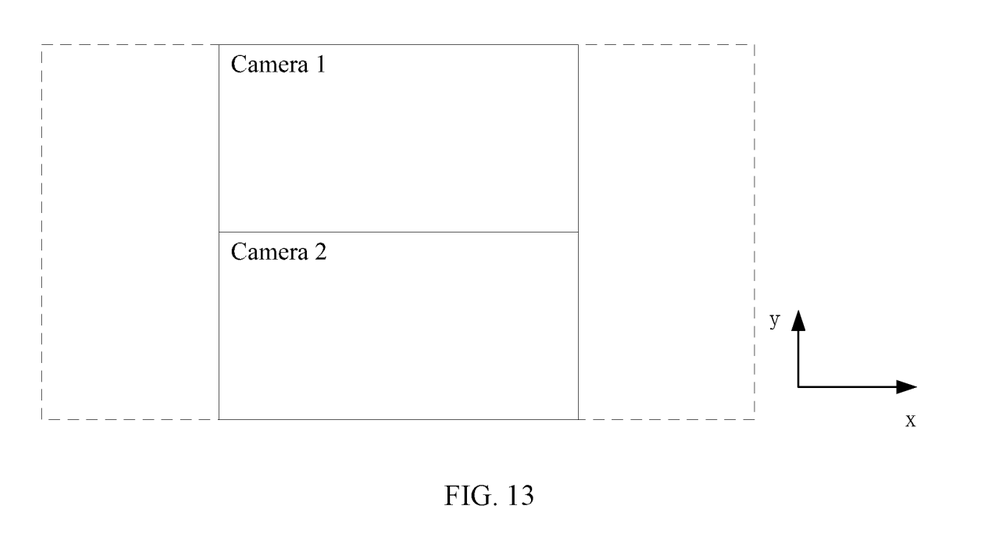
Figure 14:
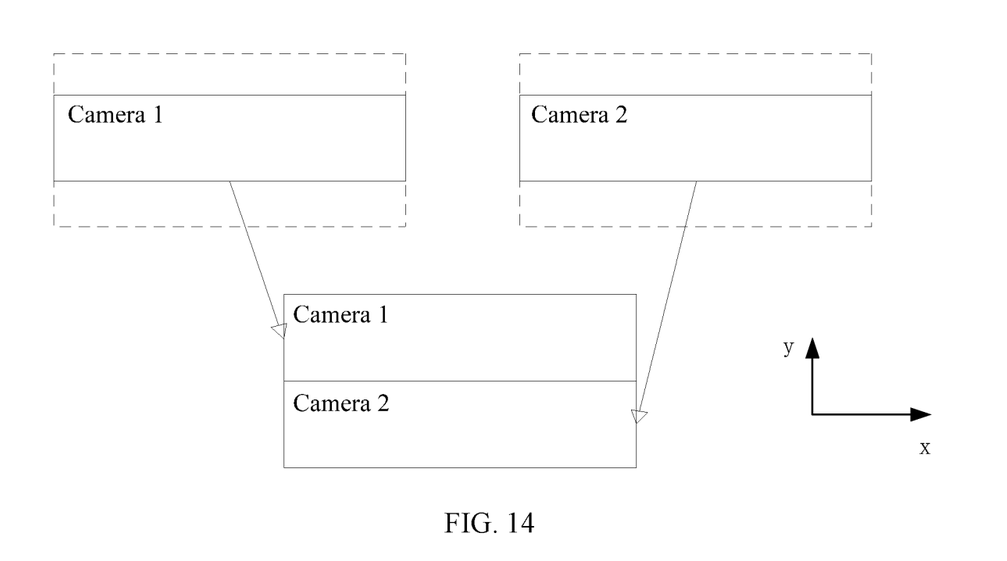
Figure 15:
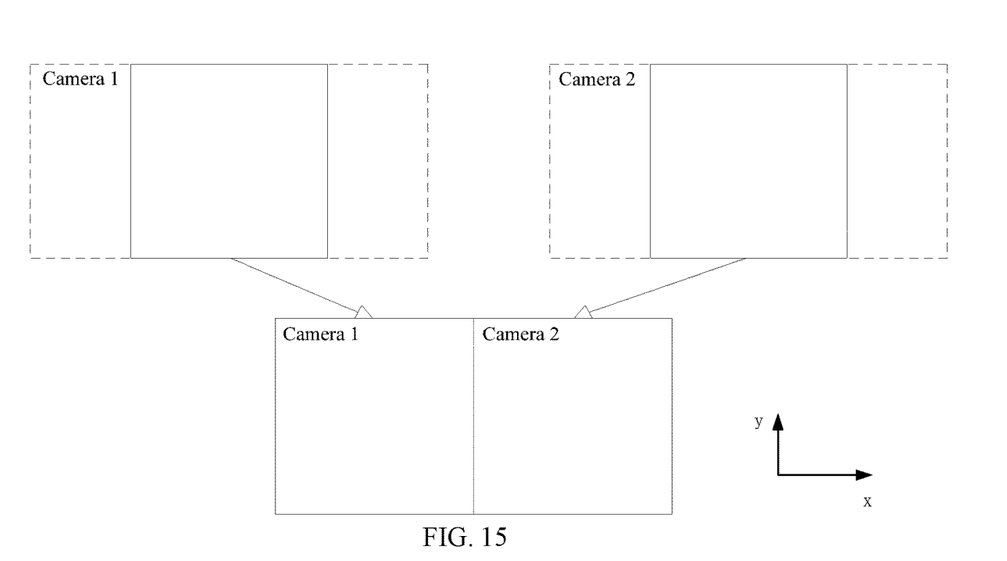
Figure 16:
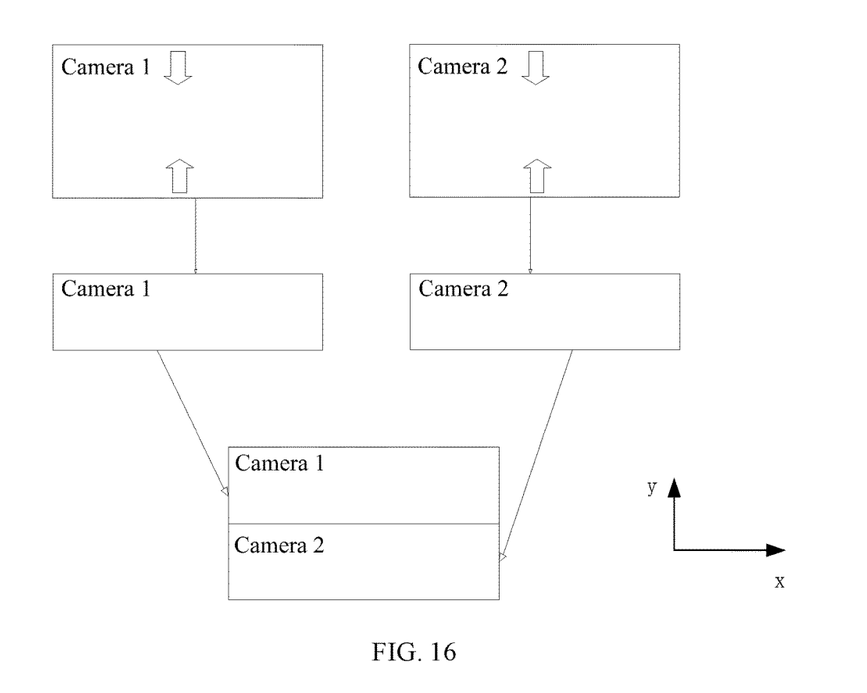

FIGS. 7-16 shows other examples of merging images. As shown in FIG. 7, the source image from Camera X is first shrinked and then displayed as the main image, and the source images from Camera a, b, and c are displayed as the secondary images. As shown in FIG. 8, the source images from Camera a, b, c, and d are displayed in a split-screen mode. As shown in FIG. 9, the source image from Camera X is displayed as the main image and the source images from other cameras, i.e., Cameras a, b, and c, are hidden or semi-transparent. As shown in FIG. 10, the source image from Camera 1 is displayed as the main image and the source image from Camera 2 is hidden or semi-transparent. As shown in FIG. 11, the source image from Camera 2 is displayed as the main image and the source image from Camera 1 is hidden or semi-transparent. As shown in FIG. 12, the source images from Cameras 1 and 2 are arranged side-by-side in the left-right direction. As shown in FIG. 13, the source images from Cameras 1 and 2 are arranged side-by-side in the up-down direction. As shown in FIG. 14, the source images from Cameras 1 and 2 are cropped in the up-down direction and then arranged side-by-side in the up-down direction. As shown in FIG. 15, the source images from Cameras 1 and 2 are cropped in the left-right direction and then arranged side-by-side in the left-right direction. As shown in FIG. 16, the source images from Cameras 1 and 2 are shrinked in the up-down direction and then arranged side-by-side in the up-down direction.

The numbers and configurations of the cameras as well as the layouts and display modes of the images in the above description are merely exemplary. Other embodiments conceived by those having the original skills in the art by modifying or altering the forms, quantities, and contents of the disclosure on the basis of the described embodiment should fall within the scope of the present disclosure. For example, the image transmission system may include five cameras, and the image input-output processing matrix table may include a field of transparency.

Figure 17:
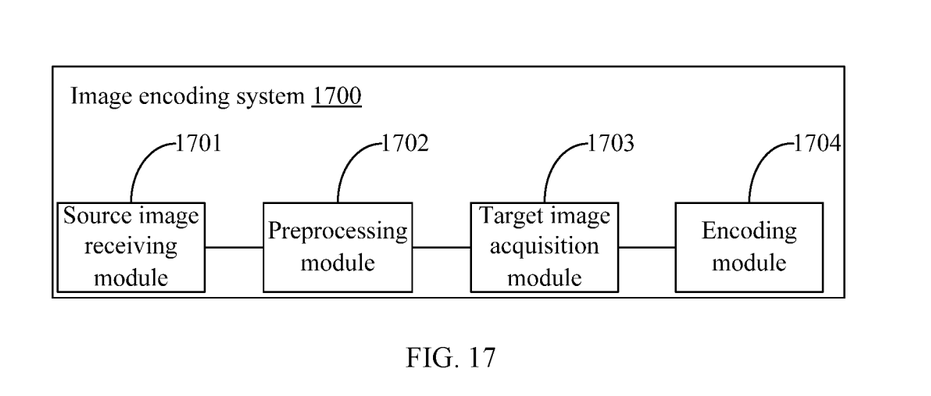
FIG. 17 is a schematic structural diagram of an image encoding system according to an exemplary embodiment.

FIG. 17 is a schematic structural diagram of an exemplary image encoding system 1700 consistent with the disclosure. The system 1700 can implement a method consistent with the disclosure, such as one of the above-described exemplary methods. Herein, detailed description of the corresponding contents is omitted and references can be made to the descriptions of the exemplary methods.

The system 1700 includes a source image receiving module 1701 (a source image receiving circuit), a preprocessing module 1702 (a preprocessing circuit), a target image acquisition module 1703 (a target image acquisition circuit), and an encoding module 1704 (an encoding circuit).

The source image receiving module 1701 is configured to receive at least two source images.

The preprocessing module 1702 is configured to preprocess the source images according to preset preprocessing requirements to obtain preprocessed images.

The target image acquisition module 1703 is configured to merge the preprocessed images together according to preset merging requirements to generate a target image.

The encoding module 1704 is configured to encode the target image.

Consistent with the present disclosure, the at least two source images are received. According to the preset preprocessing requirements, the source images are preprocessed. According to the preset merging requirement, the preprocessed images are merged together to generate the target image. The target image is then encoded. Because the source images are preprocessed and then the preprocessed images are merged together to generate the target image, which is then encoded for transmission, simultaneous multichannel image transmission can be achieved with a limited wireless bandwidth and without degrading the image quality of the main stream or reducing the wireless transmission distance.

In some embodiments, the at least two source images are obtained from at least two image sources, respectively.

In some embodiments, the preprocessing includes at least one of a scaling process, a cropping process, or a stretching-shrinking process.

In some embodiments, the source image receiving module 1701 includes a storage unit (a storage medium).

The storage unit is configured to store the source images in respective input caches.

In some embodiments, the image encoding system may also include a storage module (a storage medium).

The storage module is configured to store the preprocessed images in respective output caches.

In some embodiments, the preset merging requirements include merging orders and merging coordinates.

In some embodiments, the target image acquisition module 1703 is configured, according to the merging orders and merging coordinates, to store the preprocessed images sequentially in a target cache, and then form the target image in the target cache.

In some embodiments, the target image acquisition module 1703 is configured to lay out the preprocessed images by at least partially overlapping or in a split-screen mode.

In some embodiments, the target image acquisition module 1703 is configured to set one or more of the preprocessed images to be hidden or semi-transparent.

In some embodiments, the image encoding system may also include a display requirement module (display requirement circuit) or a setting module (setting circuit).

The display requirement module is configured to receive a user's display requirement.

The setting module is configured, according to the display requirement, to set the preprocessing requirements, the merging requirements, and enable flags.

In some embodiments, the setting module is configured, according to the display requirement, to manage an image input-output processing matrix table. The image input-output processing matrix table includes image source identifications for distinguishing the image sources and the preprocessing requirements, the merging requirements, and the enable flags that are respectively associated with the image source identifications.

In some embodiments, the source image receiving module 1701 is configured to receive the source images from the image sources specified by the enable flags, respectively.

Figure 18:
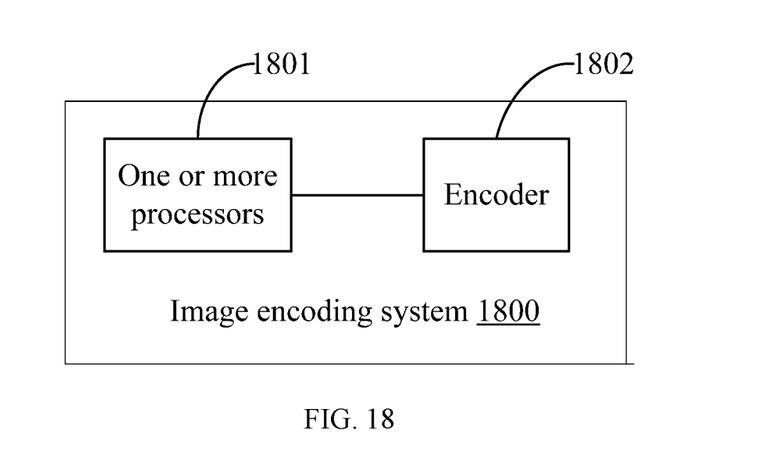
FIG. 18 is a schematic structural diagram of an image encoding system according to another exemplary embodiment.

FIG. 18 is a schematic structural diagram of another exemplary image encoding system 1800 consistent with the disclosure. The system 1800 can implement a method consistent with the disclosure, such as one of the above-described exemplary method. Herein, detailed description of the corresponding contents is omitted and references can be made to the descriptions of the exemplary methods.

The system 1800 includes one or more processors 1801 and an encoder 1802.

The one or more processors 1 are configured to receive at least two source images, preprocessing the source images according to preset preprocessing requirements to obtain preprocessed images, and merging the preprocessed images together according to preset merging requirements to generate a target image.

The encoder 2 is configured to encode the target image.

Consistent with the present disclosure, the at least two source images are received. According to the preset preprocessing requirements, the source images are preprocessed. According to the preset merging requirement, the preprocessed images are merged together to generate the target image. The target image is then encoded. Because the source images are preprocessed and then the preprocessed images are merged together to generate the target image, which is then encoded for transmission, simultaneous multichannel image transmission can be achieved with a limited wireless bandwidth and without degrading the image quality of the main stream or reducing the wireless transmission distance.

In some embodiments, the at least two source images are obtained from at least two image sources, respectively.

In some embodiments, the preprocessing includes at least one of a scaling process, a cropping process, or a stretching-shrinking process.

In some embodiments, the one or more processors 1801 include input caches, output caches, and a target cache. The source images are stored in respective input caches. The preprocessed images are stored in respective output caches. The target image is stored in the target cache.

In some embodiments, the preset merging requirements include merging orders and merging coordinates.

In some embodiments, the one or more processors 1801 are configured, according to the merging orders and merging coordinates, to store the preprocessed images sequentially in the target cache, and then form the target image in the target cache.

In some embodiments, the one or more processors 1801 are configured to arrange the preprocessed images by at least partially overlapping or in a split-screen mode.

In some embodiments, the one or more processors 1 are configured to set one or more of the preprocessed images to be hidden or semi-transparent.

In some embodiments, the at least two image sources may be at least two cameras.

In some embodiments, the one or more processors 1801 are configured to receive a user's display requirement and, according to the display requirement, set the preprocessing requirements, the merging requirements, and enable flags.

In some embodiments, the one or more processors 1801 are configured, according to the display requirement, to manage an image input-output processing matrix table. The image input-output processing matrix table includes image source identifications for distinguishing the image sources, the preprocessing requirements, the merging requirements, and the enable flags that are associated with the image source identifications.

In some embodiments, the one or more processors 1 are configured to receive the source images from the image sources specified by the enable flags, respectively.

In some embodiments, the system 1800 may further include a memory storing instructions. The one or more processors 1801 and/or the encoder 1802 can be configured to execute the instructions to perform a method consistent with the disclosure, such as one of the above-described exemplary methods.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. An image encoding method comprising:
   preprocessing source images according to preset preprocessing requirements to generate preprocessed images;
   merging the preprocessed images according to preset merging requirements to generate a target image, including:
      storing the preprocessed images sequentially in a target cache; and
      merging the preprocessed image to form the target image in the target cache according to merging orders and merging coordinates; and
   encoding the target image.

2. The method of claim 1, wherein preprocessing the source images includes:
   performing at least one of a scaling process, a cropping process, or a stretching-shrinking process on the source images.

3. The method of claim 1, further comprising, after preprocessing the source images and before merging the preprocessed images:
   storing the preprocessed images in respective output caches.

4. The method of claim 1, wherein merging the preprocessed images further includes:
   arranging the preprocessed images by at least partially overlapping or in a split-screen mode.

5. The method of claim 1, wherein merging the preprocessed images further includes:
   setting one or more of the preprocessed images to be hidden or semi-transparent.

6. The method of claim 1, further comprising:
   receiving the source images from at least two image sources, respectively.

7. The method of claim 6, wherein receiving the source images includes:
   storing the source images in respective input caches.

8. The method of claim 6, further comprising, before receiving the source images:
   receiving a user's display requirement; and
   setting the preprocessing requirements, the merging requirements, and enable flags according to the display requirement, the enable flags indicating which image sources are enabled.

9. An image encoding system comprising:
   a processor configured to:
      preprocess source images according to preset preprocessing requirements; and
      merge preprocessed images according to preset merging requirements to generate a target image, including:
         storing the preprocessed images sequentially in a target cache; and
         merging the preprocessed images to form the target image in the target cache according to merging orders and merging coordinates; and
   an encoder coupled to the processor and configured to encode the target image.

10. The system of claim 9, wherein the processor is further configured to:
   perform at least one of a scaling process, a cropping process, or a stretching-shrinking process on the source images.

11. The system of claim 9, wherein the processor is further configured to:
   store the preprocessed images in respective output caches, after preprocessing the source images and before merging the preprocessed images.

12. The system of claim 9, wherein the processor is further configured to:
   arrange the preprocessed images by at least partially overlapping or in a split-screen mode.

13. The system of claim 9, wherein the processor is further configured to:
   set one or more of the preprocessed images to be hidden or semi-transparent.

14. The system of claim 9, wherein the processor is further configured to:
   receive the source images from at least two image sources, respectively.

15. The system of claim 9, wherein the processor is further configured to:
   store the source images in respective input caches.

16. The system of claim 9, wherein the processor is further configured to:
   receive a user's display requirement before receiving the source images; and
   set the preprocessing requirements, the merging requirements, and enable flags according to the display requirement, the enable flags indicating which image sources are enabled.

* * * * *